United States Patent
Sinha

(10) Patent No.: US 11,443,446 B2
(45) Date of Patent: Sep. 13, 2022

(54) METHOD AND SYSTEM FOR DETERMINING DYNAMISM IN A SCENE BY PROCESSING DEPTH IMAGE

(71) Applicant: Tata Consultancy Services Limited, Mumbai (IN)

(72) Inventor: Arnab Sinha, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 170 days.

(21) Appl. No.: 17/036,213

(22) Filed: Sep. 29, 2020

(65) Prior Publication Data

US 2021/0097706 A1 Apr. 1, 2021

(30) Foreign Application Priority Data

Sep. 30, 2019 (IN) .............................. 201921039592

(51) Int. Cl.
*G06T 7/00* (2017.01)
*G06T 7/50* (2017.01)
*G06T 5/00* (2006.01)

(52) U.S. Cl.
CPC .............. *G06T 7/50* (2017.01); *G06T 5/002* (2013.01); *G06T 2207/10028* (2013.01)

(58) Field of Classification Search
CPC . G06T 7/50; G06T 5/002; G06T 2207/10028; G06T 2207/20076;
(Continued)

(56) References Cited

U.S. PATENT DOCUMENTS 11,190,746 B2 * 11/2021 Goldman ................ G06T 7/174
11,290,698 B2 * 3/2022 Tanaka .................. H04N 13/161
(Continued)

FOREIGN PATENT DOCUMENTS

CN 103325112 A 9/2013

OTHER PUBLICATIONS

Konde, Mayuri et al., "Real Time Motion Detection using Dynamic Camera", International Journal of Computer Applications, Mar. 2015, vol. 114—No. 7, Semantic Scholar Link: https://citeseerx.ist.psu.edu/viewdoc/download?doi=10.1.1.695.6529&rep=rep1&type=pdf.

*Primary Examiner* — Jose L Couso
(74) *Attorney, Agent, or Firm* — Finnegan, Henderson, Farabow, Garrett & Dunner LLP

(57) ABSTRACT

State of art systems in the domain of dynamism detection fail to estimate noise if depth images are being collected as input for the dynamism detection, as the noise in depth images depend on the scene being captured. Disclosed herein are method and system for determining dynamism by processing depth image of a scene. The system models depth sensor noise as ergodic stochastic process by determining that distribution estimated at each reference pixel from a plurality of neighborhood pixels in a reference image being processed is statistically same as a distribution estimated from evolution of the reference pixel over the time. After modeling the depth sensor noise in this manner, the same is eliminated/removed from the reference image, which is then processed to estimate divergence at each pixel based on temporal and spatial distribution built at pixel level in the reference image, and in turn determines dynamism in the scene.

15 Claims, 5 Drawing Sheets

(58) Field of Classification Search
CPC .............. G06T 7/277; G06T 7/215; G06T 2207/10012; G06T 2207/10016; G06T 2207/10021; G06T 2207/30244; G06T 7/285; G06T 7/55; G06T 7/579; G06T 7/593; G06T 7/70; G06T 7/10; G06T 7/20; G06T 7/207; G06T 2207/20201; H04N 13/271; H04N 13/243; H04N 13/111; H04N 2013/0081; H04N 19/43; H04N 19/51–583; H04N 5/144; H04N 5/147; H04N 5/2226; H04N 5/2228; H04N 5/23251–23264; G06V 10/24; G06K 9/32

See application file for complete search history.

(56) References Cited

U.S. PATENT DOCUMENTS

| | | | | |
|---|---|---|---|---|
| 2014/0009462 | A1* | 1/2014 | McNamer | H04N 13/128 345/419 |
| 2015/0055828 | A1* | 2/2015 | Zhao | G06T 7/248 382/103 |
| 2015/0206004 | A1* | 7/2015 | Liang | G06T 7/248 382/103 |
| 2016/0110610 | A1* | 4/2016 | Ikenoue | G06V 40/10 382/103 |

\* cited by examiner

Result of dynamism detection by system 100

Result of dynamism detection by system 100

METHOD AND SYSTEM FOR DETERMINING DYNAMISM IN A SCENE BY PROCESSING DEPTH IMAGE

PRIORITY CLAIM

This U.S. patent application claims priority under 35 U.S.C. § 119 to: India Application No. 201921039592, filed on Sep. 30, 2019. The entire contents of the aforementioned application are incorporated herein by reference.

TECHNICAL FIELD

This disclosure relates generally to image processing, and more particularly to a method and system for determining dynamism in a scene by processing depth image of the scene, captured from a moving camera.

BACKGROUND

Detecting dynamism in a scene refers to detecting dynamic movement of one or more objects in the scene. The dynamism detection finds its application in a variety of fields such as but not limited to robotics and augmented/virtual reality. In robotics, in various circumstances a robot may have to detect presence or absence of objects in own field of view. In augmented reality (AR) based systems, users are allowed to interact with the system in real-time and the system takes/triggers certain actions in response. For example, the AR based gaming systems detect user movements and accordingly perform corresponding actions.

The inventors here have recognized several technical problems with such conventional systems, as explained below. In all these examples, the system needs to detect dynamic changes in a field of view of a moving image sensor which is part of the system. However, like in any other image processing techniques, state of art systems in the domain of dynamism detection also face challenges due to presence of noise in the scene. Especially when images captured are depth images, noise level is dependent on the scenes, and each pixel in the image may represent different characteristics of the noise. As a result, it is difficult to model the noise beforehand if the system is capturing depth images as input, which in turn may result in the system interpreting the noise contents as dynamic objects, which in turn affects accuracy of the dynamism detection being performed.

SUMMARY

Embodiments of the present disclosure present technological improvements as solutions to one or more of the above-mentioned technical problems recognized by the inventors in conventional systems. For example, in one embodiment, For example, in one embodiment, a processor implemented method for determining dynamism is provided. In this process, a depth image of a scene at time instance 't' is collected as a reference image, via one or more hardware processors, wherein a depth sensor noise associated with the collected reference image is modelled as an ergodic stochastic process. Modelling the depth sensor noise as the ergodic stochastic process comprises determining that distribution estimated at each reference pixel from a plurality of neighborhood pixels is statistically same as a distribution estimated from evolution of the reference pixel over the time. Further, a plurality of historical depth images are re-projected onto the current time 't' via one or more hardware processors. Then a spatial distribution is built at each of a plurality of pixels of the reference image, by processing the reference image via the one or more hardware processors. Further, a temporal distribution is built at each of a plurality of pixels of the filtered reference image, by processing the re-projected historical depth images corresponding to the filtered reference image via the one or more hardware processors. Further, divergence at each of the plurality of pixels of the reference image is determined, based on the spatial distribution and the temporal distribution, via the one or more hardware processors. Further, dynamism in the scene is determined based on the determined divergence in at least a few of the plurality of pixels, via the one or more hardware processors.

In another aspect, a system for determining dynamism is provided. The system comprises one or more hardware processors, one or more communication interfaces, and one or more memory storing a plurality of instructions. The plurality of instructions when executed cause the one or more hardware processors to collect a depth image of a scene at time instance 't' as a reference image, via one or more hardware processors, wherein a depth sensor noise associated with the collected reference image is modelled as an ergodic stochastic process. The system models the depth sensor noise as the ergodic stochastic process by determining that distribution estimated at each reference pixel from a plurality of neighborhood pixels is statistically same as a distribution estimated from evolution of the reference pixel over the time. Further, a plurality of historical depth images are re-projected onto the current time 't' via one or more hardware processors. The system then builds a spatial distribution at each of a plurality of pixels of the reference image, by processing the reference image via the one or more hardware processors. The system further builds a temporal distribution at each of a plurality of pixels of the filtered reference image, by processing the re-projected historical depth images via the one or more hardware processors. Further, the system determines divergence at each of the plurality of pixels of the reference image based on the spatial distribution and the temporal distribution, via the one or more hardware processors. Further, the system determines dynamism in the scene based on the determined divergence in at least a few of the plurality of pixels, via the one or more hardware processors.

In yet another aspect, a non-transitory computer readable medium for determining dynamism is provided. The non-transitory computer readable medium comprises program codes which when executed cause the non-transitory computer readable medium to determine dynamism in a scene, by executing steps in the following method. In this process, a depth image of a scene at time instance 't' is collected as a reference image, via one or more hardware processors, wherein a depth sensor noise associated with the collected reference image is modelled as an ergodic stochastic process. Modelling the depth sensor noise as the ergodic stochastic process comprises determining that distribution estimated at each reference pixel from a plurality of neighborhood pixels is statistically same as a distribution estimated from evolution of the reference pixel over the time. Further, a plurality of historical depth images corresponding to each reference pixel being considered in the reference image are re-projected to the time instance 't', via the one or more hardware processors. Then a spatial distribution is built at each of a plurality of pixels of the filtered reference image, by processing the filtered reference image via the one or more hardware processors. Further, a temporal distribution is built at each of a plurality of pixels of the filtered reference image, by processing the re-projected historical depth images via the one or more hardware processors. Further, divergence at each of the plurality of pixels of the filtered reference image is determined, based on the spatial distribution and the temporal distribution, via the one or more hardware processors. Further, dynamism in the scene is determined based on the determined divergence in at least a few of the plurality of pixels, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
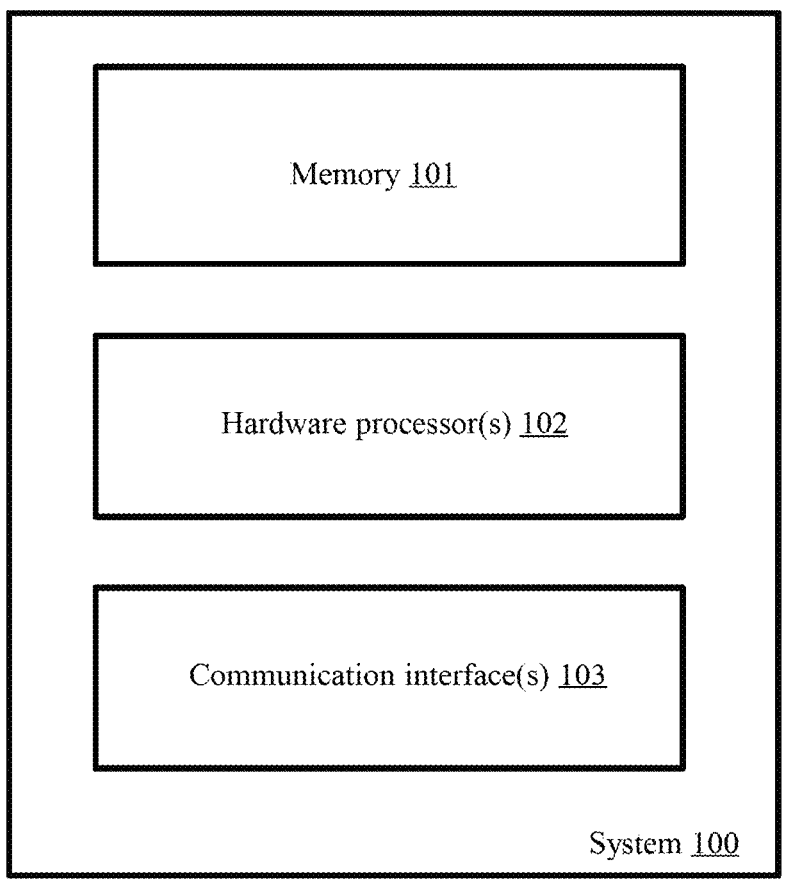
FIG. 1 illustrates an exemplary system for detecting dynamism in a scene, according to some embodiments of the present disclosure.

FIG. 1 illustrates an exemplary system for detecting dynamism in a scene, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory, so as to perform one or more actions associated with the process of determining dynamism in one or more scenes. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. The communication interface(s) 103 can be further configured to provide one or more appropriate channels having suitable communication protocols so as to facilitate data transfer between different components of the system 100, or between the system 100 and one or more other external systems.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store operational instructions/program codes which when executed cause one or more of the hardware processor(s) 102 to perform various actions associated with the dynamism detection being handled by the system 100. The memory 101 can be configured to store all or selected data associated with the process of detecting dynamism in the scenes(s). For example, the memory 101 may store input image(s) for dynamism detection and corresponding results generated, over a period of time, and may further allow user(s) having necessary permission(s) to access (and use, if needed) the stored data. The various steps involved in the process of determining/detecting dynamism are explained with description of FIG. 2. All the steps in FIG. 2 are explained with reference to the system of FIG. 1.

Figure 2:
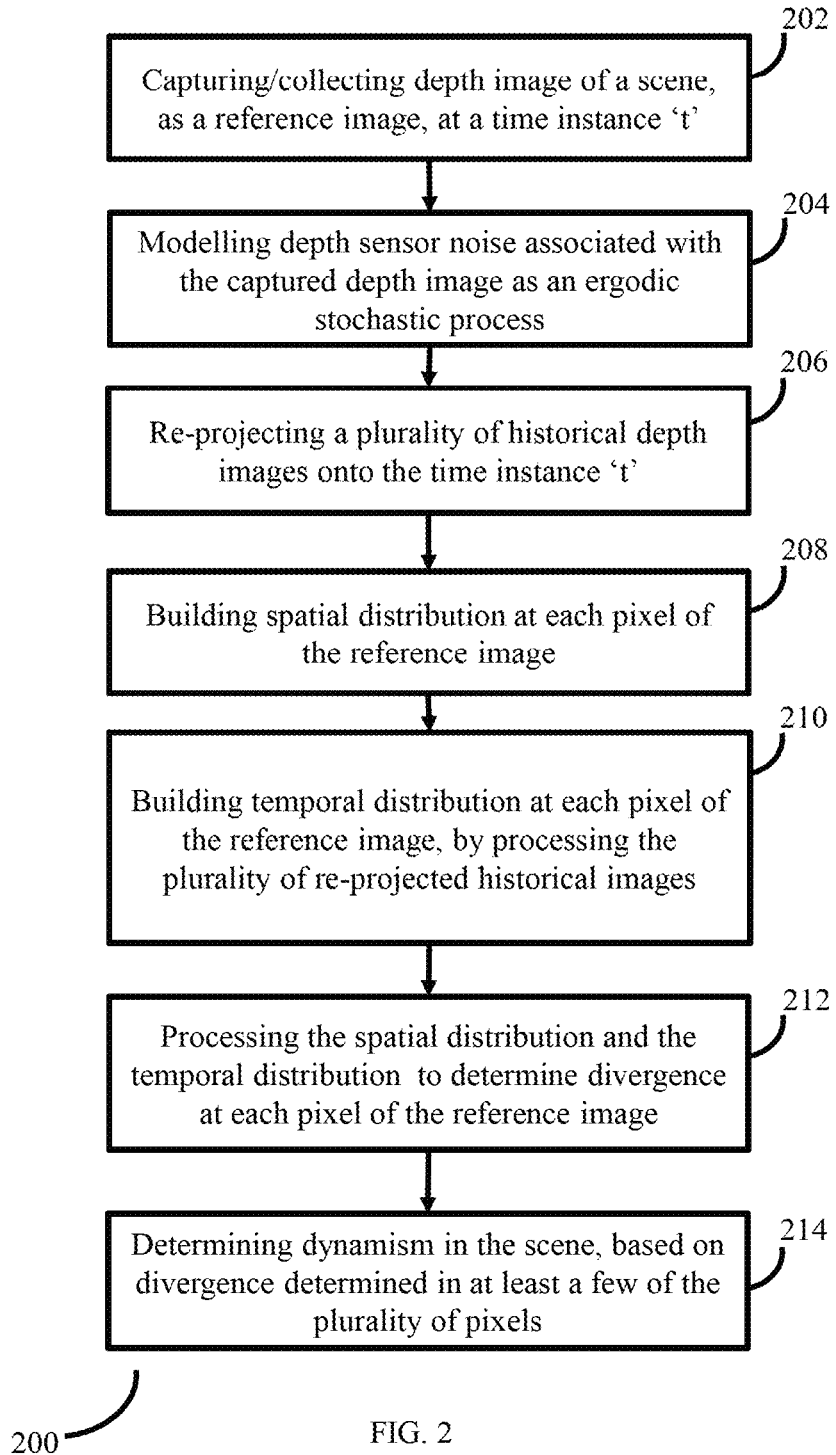
FIG. 2 is a flow diagram depicting steps involved in the process of detecting dynamism in a scene, using the system of FIG. 1, according to some embodiments of the present disclosure.

FIG. 2 is a flow diagram depicting steps involved in the process of detecting dynamism in the scene, using the system of FIG. 1, according to some embodiments of the present disclosure. The system 100 performs the step of detecting dynamism (alternately referred to as 'dynamism detection') so as to detect/determine presence of dynamic object(s) in depth image of a particular scene (or 'Field of View (FoV)'), captured by the system 100 as input. The system 100 can be implemented in a variety of ways. In an embodiment, the system 100 is a stand-alone system, with appropriate data capturing means attached/connected externally (for example, a depth-image sensor). In another embodiment, the system 100 can be a component of a larger machine/system. For example, the system 100 is a component of a robot that scans an area/location/scene for detecting presence of one or more dynamic objects, along with other related capabilities. In this example, the system 100 performs the dynamism detection, and corresponding data/results can be used by the robot to perform one or more actions associated with one or more applications being handled by the robot. In another embodiment, the system 100 is part of a central node which is in communication with multiple other machines/systems (for example, robots). In this scenario, the system 100 may collect one or more input(s), and then performs the dynamism detection for scenes in the collected inputs, at once or in a sequential manner.

The system 100 captures/collects/receives (202) a depth image of a scene as input, from one or more associated depth image sensors, as a reference image. The reference image is then processed at pixel level by the system (100), and steps 206-214 are performed at each pixel out of a plurality of pixels, and the pixel being considered and processed at any instance is referred to as a 'reference pixel'.

Further, for the captured reference image, the system 100 models (204) a depth sensor noise associated with the reference image as an ergodic stochastic process. At this step, the system 100 determines that distribution estimated at each reference pixel from a plurality of neighborhood pixels in the reference image is statistically same as a distribution estimated from evolution of the reference pixel over the time. Modeling the noise as the ergodic stochastic process results in the noise remaining fixed for each pixel, which in turn allows the system 100 to estimate the noise with respect to spatial and dynamic distribution at pixel level in the reference image. After modeling the depth sensor noise as the ergodic stochastic process, steps 206-214 are executed by the system 100 to perform the dynamism detection.

At step 206, the system re-projects a plurality of historical depth images for each reference pixel being considered in the reference image. Here the term 'historical depth images' refers to a plurality of images of the same scene, which are captured prior to capturing the reference image i.e. prior to the time instance 't'. By re-projecting, the historical depth images corresponding to the reference pixel are mapped to the reference pixel, for further processing.

The system 100 then builds (208) a spatial distribution at each pixel of the filtered reference image. In an embodiment, the system 100 may use any known, suitable approach/technique for the purpose of building the spatial distribution at pixel level in the filtered reference image. Data being used by the system 100 for building the spatial distribution is information pertaining to the reference image collected at a time instance 't'. The system 100 further builds (210) a temporal distribution at each pixel of the filtered reference image. In an embodiment, the system 100 may use any known, suitable approach/technique for the purpose of building the temporal distribution at pixel level in the filtered reference image. Data processed by the system 100 for building the temporal distribution are the re-projected historical depth images for the reference pixel being processed. This data is processed using appropriate technique so as to build the temporal distribution.

After determining the spatial and the temporal distributions, the system 100 then processes data pertaining to the spatial and the temporal distributions, and determines (212) divergence at each pixel of the reference image. Value of difference (or divergence) between the spatial and temporal distributions are zero, if the reference pixel corresponds to or contains data pertaining to a static object. However, if the reference pixel corresponds to a dynamic object, the value of divergence exceeds the value 'zero', and increases proportional to increase in dynamism of the object.

Further, based on the determined value of the divergence, the system 100 determines dynamism in the scene. In various embodiments, the dynamism is determined at a single pixel level or for a group of pixels from the plurality of pixels in the reference image. In addition to determining presence or absence of dynamism, the system 100 also determines extent of dynamism based on the value of divergence. For example, if the value of the determined divergence if small (maybe in comparison with a threshold, wherein the threshold may be pre-configured or dynamically configured with the system 100, and may be stored in appropriate database in memory 101), then the system 100 determines that the dynamism is minimal. Similarly, if the value of the determined divergence if higher in comparison with the threshold, then the system 100 determines that the dynamism is maximum, with the extent of dynamism increasing with increase in value of the divergence.

The steps in method 200 are explained from a mathematical perspective below:

Let $k^{th}$ reference image (depth image) be represented as:

$$I_k(x)=z_k \quad (1)$$

Where
$x=\{x,y\}^T \in \Omega$ denotes pixel coordinates.

In Homogeneous coordinate systems, the reference pixel is written as $X_H=\{x, y, 1\}^T$. The pixel $X_H$ can be projected to a 3-dimensional (3D) point according to its depth $I_K(x)$, as in equation (2).

$$P_k(x) = \pi^{-1}(x, z_k) = \left\{\frac{x-c_x}{f_x}z_k, \frac{y-c_y}{f_y}z_k, z_k, 1\right\}^T \quad (2)$$

Where $(f_x, f_y)$ represents focal lengths of the depth sensor used for capturing the reference image, along x and y directions respectively, and $(c_x, c_y)$ represents principle points along respective directions.

Given a series of N depth frames, $I_K$, for k=1, 2, ... N, and transformation matrices $k_{T_w}=[k_{R_w}, k_{t_w}; 0\ 1]$ of the frames with respect to a global coordinate system (W), transform between two frames k=i and k=j can be computed as:

$$i_{T_j}=i_{T_W}*(j_{T_W})^{-1} \quad (3)$$

Now the re-projection of historical depth images can be done as below:

Re-projection of points (such as x) from $i^{th}$ frame to $j^{th}$ frame, according to corresponding depth value $I_i(x)=z_i$ can be done as in equation (4).

$$\widehat{x_H} = K^j T_i P_i(x) \quad (4)$$

Where $K=[f_x\ 0\ c_x; 0\ f_y\ c_y; 0\ 0\ 1]$ is camera internal matrix. So equation (4) can be used to build a new depth image. At this stage the system 100 has Î a set of N predicted depth frames at time frame j.

Two probabilistic models are used by the system 100, one for $\hat{I}(x)$ and one for $I_N(x)$. Another assumption made is that both the probabilistic structures being considered are Gaussian, however, any nonparametric probabilistic structure can be used. Samples considered to estimate the probability structures are given as:

$$Y_t(x)=\{j-k^{Ij(x)}: \forall k=N, \ldots 1\} \quad (5)$$

$$Y_s(x)=\{I_N(r): r \in \aleph_o(x)\} \quad (6)$$

where $\aleph_o$ defines a neighborhood system of order o, given as:

$$\aleph_o(x)=\{r: \|r-x\| \leq o\} \quad (7)$$

According to the ergodic assumption made by the system 100, samples from temporal re-projected depth images at location x and samples collected spatially at a current original depth map at the same location are generated from the same probabilistic function, had it been from a static background. If the two generated sample sets are from different probabilistic distributions, it implies that the current depth value at location x is coming from a dynamic background. The fields are defined for the spatial and temporal sample sets as:

$$M_t(x) = \frac{1}{N}\sum_{k=1}^{N} Y_t(x) \qquad (8)$$

$$M_s(x) = \frac{1}{|\aleph_0(x)|}\sum_{k=1}^{N} Y_s(x) \qquad (9)$$

$$V_t(x) = \frac{1}{N}\sum_{k=1}^{N} (Y_t(x) - M_t(x))^2 \qquad (10)$$

$$V_s(x) = \frac{1}{|\aleph_0(x)|}\sum_{k=1}^{N} (Y_s(x) - M_s(x))^2 \qquad (11)$$

In order to perform the dynamism estimation, initially the fields $M_t$, $M_s$, $V_t$, $V_s$ are smoothed with a Gaussian filter, so as to remove any noise that may be present. Metric for estimating the dynamism is defined as:

$$L(x) = \log\left(\frac{V_s(x)}{V_t(x)}\right) + \frac{V_t(x)^2 + (M_t(x) - M_s(x))^2}{2 * V_s(x)^2 * I_N x^2} \qquad (12)$$

If two distributions are uni-variate Gaussian, the divergence between the two distributions can be rewritten as:

$$KL(x) = -\frac{1}{2} + \log\left(\frac{V_s(x)}{V_t(x)}\right) + \frac{V_t(x)^2 + (M_t(x) - M_s(x))^2}{2 * V_s(x)^2 * I_N x^2} \qquad (13)$$

In (5) and (6), if ratio of values are considered instead of considering actual depth values, i.e.

$$Y_t(x) = \left\{\frac{j - k^{j_{j(x)}}}{I_N(x)} : \forall k = N, \ldots .1\right\} \qquad (14)$$

$$Y_s(x) = \left\{\frac{I_N(r)}{I_N(x)} : r \in \aleph_0(x)\right\} \qquad (15)$$

then the KL divergence metric as in (12) is expected, as $I_N(x)$ remains constant over k=1, . . . , N, in (8), (9), (10), and (11).

Experimental Results:

For the purpose of experimentation, data from an open database "TUM-RGBD" was considered, apart from data internally created. The data considered had a UAV flying in front of a depth sensor used. Performance of the dynamism detection methodology disclosed herein was compared with a state of art technique "BaMVO". BaMVO defines a random variable with difference in between a wrapped depth image and original depth image, as shown below:

$$D_{j-k}{}^j = j - k^{f_j} - I_j \qquad (16)$$

Figure 3A:
FIG. 3A illustrate a first example result of dynamism detection performed by a state of art technique and the method and system disclosed herein, in accordance with some embodiments of the present disclosure.
Figure 3B:
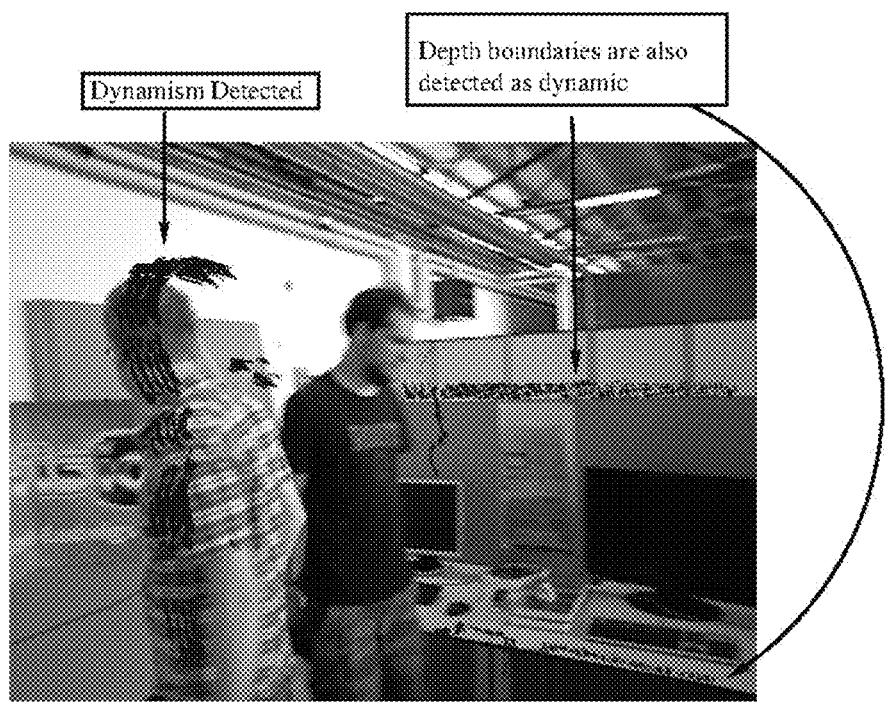
FIG. 3B illustrate a second example result of dynamism detection performed by a state of art technique and the method and system disclosed herein, in accordance with some embodiments of the present disclosure.
Figure 3C:
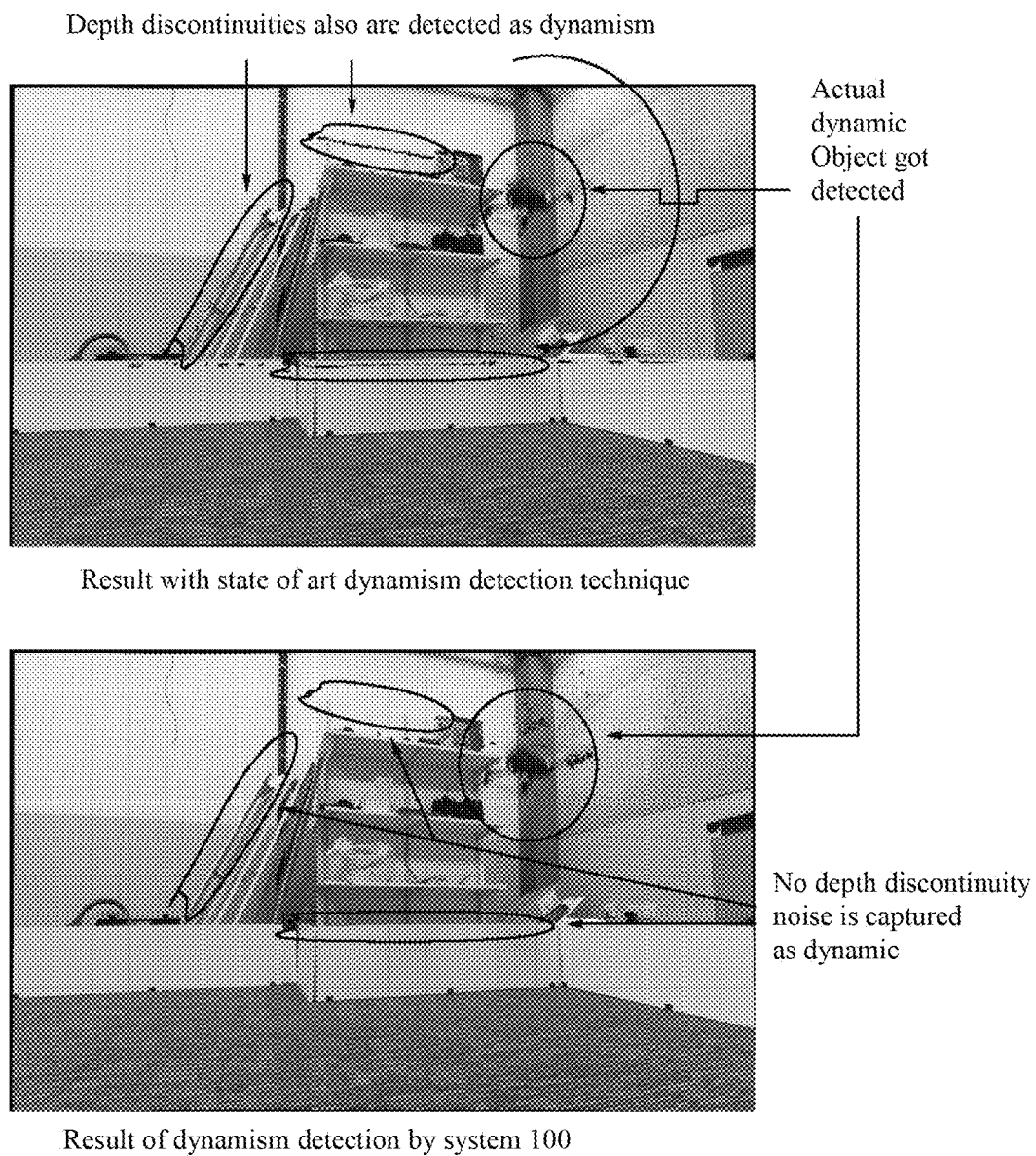
FIG. 3C illustrate a third example result of dynamism detection performed by a state of art technique and the method and system disclosed herein, in accordance with some embodiments of the present disclosure.

BaMVO requires only the parameter 'k (number of previous frames)' to be provided by a user. The method and system disclosed herein also requires 'k' as a user input to the system 100. Experiments proved that quality of result increases with increase in number of frames considered, in BaMVO as well as in the method and system disclosed herein. However, the results indicated that noise in comparison is very less in results of the method and system disclosed herein. In addition to this, results generated by the system 100 also distinguishes parts of result in terms of extent of dynamism detected. This is depicted in FIGS. 3A and 3B, wherein 3B depicts result obtained with BaMVO and 3A depicts result obtained with the system 100. In 3A, more dynamic areas are represented by darker areas and less dynamic areas are represented by lighter areas. As can be seen in 3B, BaMVO tends to detect depth boundaries also as dynamic, which in turn results in less accuracy. When experiments were conducted based on data in which the dynamic object is occluded by static objects, results obtained by system 100 contained less noise in comparison with the result produced by BaMVO. Other scenarios tried during experimentation are with the depth sensor rotating abruptly and size of the dynamic objects being small. In both the scenarios, the method and system disclosed herein appear to be giving better results than BaMVO in terms of accuracy of the dynamism detection performed. BaMVO in certain conditions even failed to detect the dynamic object having smaller size. Examples in FIG. 3C depict that BaMVO tends to detect/interpret depth discontinuity also as dynamic, whereas the system 100 detects only the dynamic object and not the depth discontinuity as dynamic.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for determining dynamism, comprising:
    collecting a depth image of a scene at time instance 't' as a reference image, via one or more hardware processors, wherein a depth sensor noise associated with the collected reference image is modelled as an ergodic stochastic process;
    re-projecting a plurality of historical depth images onto the time instance 't', via the one or more hardware processors;
    building a spatial distribution at each of a plurality of pixels of the reference image, by processing the reference image via the one or more hardware processors;
    building a temporal distribution at each of the plurality of pixels of the reference image, by processing the plurality of re-projected historical depth images via the one or more hardware processors;
    determining divergence at each of the plurality of pixels of the reference image, based on the spatial distribution and the temporal distribution, via the one or more hardware processors; and
    determining dynamism in the scene, based on the determined divergence in one or more of the plurality of the pixels, via the one or more hardware processors.

2. The method as claimed in claim 1, wherein the plurality of historical depth images are images of the scene taken prior to the time instance 't'.

3. The method as claimed in claim 1, wherein modelling the depth sensor noise as the ergodic stochastic process comprises determining that distribution estimated at each reference pixel from a plurality of neighborhood pixels is statistically same as a distribution estimated from evolution of the reference pixel over the time.

4. The method as claimed in claim 3, wherein the evolution of the reference pixel is a change of a pixel at the reference image, measured from the re-projected historical depth images at the pixel.

5. The method as claimed in claim 1, wherein determining the dynamism in the scene based on the determined divergence comprises:
    determining that object in at least a few of the plurality of pixels is a static object if value of determined divergence for the at least a few of the plurality of pixels is zero; and
    determining that object in the at least a few of the plurality of pixels is a dynamic object if value of determined divergence for the at least a few of the plurality of pixels is a value exceeding zero.

6. The method as claimed in claim 1, wherein extent of dynamism is determined based on value of the determined divergence between the spatial distribution and the temporal distribution.

7. A system for determining dynamism, comprising:
    one or more hardware processors;
    one or more communication interfaces; and
    one or more memory storing a plurality of instructions, wherein the plurality of instructions when executed cause the one or more hardware processors to:
        collect a depth image of a scene at time instance 't' as a reference image, via one or more hardware processors, wherein a depth sensor noise associated with the collected reference image is modelled as an ergodic stochastic process;
        re-project a plurality of historical depth images onto the time instance 't', via one or more hardware processors;
        build a spatial distribution at each of a plurality of pixels of the reference image, by processing the reference image via the one or more hardware processors;
        build a temporal distribution at each of the plurality of pixels of the reference image, by processing the plurality of re-projected historical depth images via the one or more hardware processors;
        determine divergence at each of the plurality of pixels of the reference image, based on the spatial distribution and the temporal distribution, via the one or more hardware processors; and
        determine dynamism in the scene, based on the determined divergence in one or more of the pixels, via the one or more hardware processors.

8. The system as claimed in claim 7, wherein the plurality of historical depth images are images of the scene taken prior to the time instance 't'.

9. The system as claimed in claim 7, wherein the system is configured to model the depth sensor noise as the ergodic stochastic process by determining that distribution estimated at each reference pixel from a plurality of neighborhood pixels is statistically same as a distribution estimated from evolution of the reference pixel over the time.

10. The system as claimed in claim 9, wherein the evolution of the reference pixel is a change of a pixel at the reference image, measured from the re-projected historical depth images at the pixel.

11. The system as claimed in claim 7, wherein the system determines the dynamism in the scene based on the determined divergence by:
    determining that object in at least a few of the plurality of pixels is a static object if value of determined divergence for the at least a few of the plurality of pixels is zero; and
    determining that object in the at least a few of the plurality of pixels is a dynamic object if value of determined divergence for the at least a few of the plurality of pixels is a value exceeding zero.

12. The system as claimed in claim 7, wherein the system determines an extent of dynamism based on value of the determined divergence between the spatial distribution and the temporal distribution.

13. A non-transitory computer readable medium for determining dynamism, the non-transitory computer readable medium comprising a plurality of instructions which when executed cause one or more hardware processors to:
    collect a depth image of a scene at time instance 't' as a reference image, wherein a depth sensor noise associated with the collected reference image is modelled as an ergodic stochastic process;
    re-project a plurality of historical depth images onto the time instance 't';
    build a spatial distribution at each of a plurality of pixels of the reference image, by processing the reference image;
    build a temporal distribution at each of the plurality of pixels of the reference image, by processing the plurality of re-projected historical depth images;
    determine divergence at each of the plurality of pixels of the reference image, based on the spatial distribution and the temporal distribution; and determine dynamism in the scene, based on the determined divergence in one or more of the plurality of the pixels.

14. The non-transitory computer readable medium as claimed in claim 13, wherein modelling the depth sensor noise as the ergodic stochastic process comprises determining that distribution estimated at each reference pixel from a plurality of neighborhood pixels is statistically same as a distribution estimated from evolution of the reference pixel over the time.

15. The non-transitory computer readable medium as claimed in claim 13, wherein determining the dynamism in the scene based on the determined divergence comprises:
  determining that object in at least a few of the plurality of pixels is a static object if value of determined divergence for the at least a few of the plurality of pixels is zero; and
  determining that object in the at least a few of the plurality of pixels is a dynamic object if value of determined divergence for the at least a few of the plurality of pixels is a value exceeding zero.

* * * * *